United States Patent
Bender (10) Patent No.: US 11,223,262 B1
(45) Date of Patent: Jan. 11, 2022

(54) ROTATING PUNCH WITH A RELIEF FEATURE FOR FORMING IPM MOTOR ROTOR

(71) Applicant: Tempel Steel Company, Chicago, IL (US)

(72) Inventor: Mark D. Bender, Algonquin, IL (US)

(73) Assignee: Tempel Steel Company, Chicago, IL (US)

( * ) Notice: Subject to any disclaimer, the term of this patent is extended or adjusted under 35 U.S.C. 154(b) by 0 days.

(21) Appl. No.: 17/075,407

(22) Filed: Oct. 20, 2020

(51) Int. Cl.
| | | |
|---|---|---|
| *H02K 15/02* | (2006.01) |
| *H02K 15/16* | (2006.01) |
| *H02K 15/03* | (2006.01) |
| *H02K 7/04* | (2006.01) |
| *H02K 1/27* | (2006.01) |

(52) U.S. Cl.
CPC .......... *H02K 15/165* (2013.01); *H02K 1/276* (2013.01); *H02K 7/04* (2013.01); *H02K 15/03* (2013.01); *Y10T 29/49012* (2015.01)

(58) Field of Classification Search
CPC .... H02K 15/02; H02K 15/024; H02K 21/185; Y10T 29/49009; Y10T 29/49078; Y10T 29/49012; Y10T 29/53143; Y10T 83/06
USPC ......... 29/598, 428, 432, 596, 604, 609, 732, 29/738
See application file for complete search history.

(56) References Cited

U.S. PATENT DOCUMENTS

| | | | | |
|---|---|---|---|---|
| 7,002,277 B2* | 2/2006 | Yamamoto | ............. | H02K 15/02 29/596 |
| 2019/0259531 A1* | 8/2019 | Daria | .................... | H02K 15/02 |

FOREIGN PATENT DOCUMENTS

| | | |
|---|---|---|
| CN | 109378947 A | 2/2019 |
| JP | 2014171329 A | 9/2014 |
| JP | 2016019381 A | 2/2016 |
| JP | 2018007530 A | 1/2018 |
| KR | 1020100007615 A | 1/2010 |

OTHER PUBLICATIONS

Korean Intellectual Property Office, International Search Report for PCT/US2021/030897, dated Aug. 25, 2021, 3 pages.
Korean Intellectual Property Office, Written Opinion of the International Searching Authority for PCT/US2021/030897, dated Aug. 25, 2021, 4 pages.

* cited by examiner

*Primary Examiner* — Thiem D Phan
(74) *Attorney, Agent, or Firm* — Greensfelder, Hemker & Gale, P.C.

(57) ABSTRACT

Disclosed herein is a method for forming a rotor or stator core. The method includes the steps of: providing a plurality of key punches disposed about an inner diameter area of a sheet of electrical steel and circumferentially spaced from one another and activating a first key punch of the plurality of key punches to cut the electrical steel sheet to remove a portion to form a first key disposed at a first key rotational angle from the line of orientation from a plurality of key rotational angles.

20 Claims, 7 Drawing Sheets

ROTOR "A"

FIG. 4B

ROTOR "B"

FIG. 4C

ROTOR "C"

FIG. 4D

ROTOR "D"

| 602 | PROVIDING A SHEET OF ELECTRICAL STEEL |
|---|---|
| 604 | PROVIDING A PLURALITY OF KEY PUNCHES |
| 606 | PROVIDING AN INNER DIAMETER PUNCH |
| 608 | ACTIVATING A FIRST KEY PUNCH |
| 610 | POSITIONING THE FIRST RELIEF AREA OVER THE FIRST KEY |
| 612 | REPEATING THE KEY PUNCHING AND ID PUNCHING STEPS |
| 614 | STACKING LAMINATIONS INTO A FIRST STACK OF LAMINATIONS |
| 616 | ACTIVATING A SECOND KEY PUNCH TO FORM A SECOND KEY |
| 618 | POSITIONING THE FIRST RELIEF AREA OVER THE SECOND KEY |
| 620 | REPEATING THE KEY PUNCHING AND ID PUNCHING STEPS |
| 622 | PROVIDING A SHAFT WITH A KEYWAY |
| 624 | MOUNTING THE FIRST STACK OF LAMINATIONS ON THE SHAFT |
| 626 | MOUNTING THE SECOND STACK ON THE SHAFT |

ROTATING PUNCH WITH A RELIEF FEATURE FOR FORMING IPM MOTOR ROTOR

CROSS-REFERENCE TO RELATED APPLICATIONS

None.

FEDERALLY SPONSORED RESEARCH OR DEVELOPMENT

N/A

FIELD OF THE INVENTION

The present invention provides a rotating punch with a relief feature for forming blanked laminates of electric steel, a rotor core formed by stacking and connecting the laminates, a method for forming a rotor core for an interior permanent magnet (IPM) motor.

BACKGROUND OF THE INVENTION

Electric motors come in a variety of shapes and sizes and are in vast use and impact every aspect of industrial, commercial and residential life. Motors are commonly used to convert electrical energy into rotating energy or rotational force. One type of motor is known as an internal permanent magnet (IPM) motor. IPM motors are synchronous alternating current (AC) type. An IPM motor rotor core has a plurality permanent magnets equally circumferentially spaced about the rotor. The magnets have a length, width, and height dimension with the length dimension extending radially of the central axis of rotation and the height dimension extending along a line parallel to the axis of rotation. Each lamination has a punched out section matching the cross-sectional shape of the magnet and when the laminations are stacked the punched out sections align to form a slot for receiving and securing the magnet.

The rotor core is formed by punching laminations from a strip of electric steel and stacking the laminations into lamination packets. Minute variations in the thickness of the electric steel add up in these packets to create an imbalanced packet. Generally, the rotor core will have 2 integral keys for engaging corresponding keyways in a power shaft to which the packets are mounted and secured. This dictates that if it is desired to rotate the individual laminations in the blanking station to disorient for these material thickness variations the rotational angle must be 180°. Indexing large parts 180° will result in slower press speeds when compared to indexing by a small index angle or no index angle at all.

Figures 1, 3:
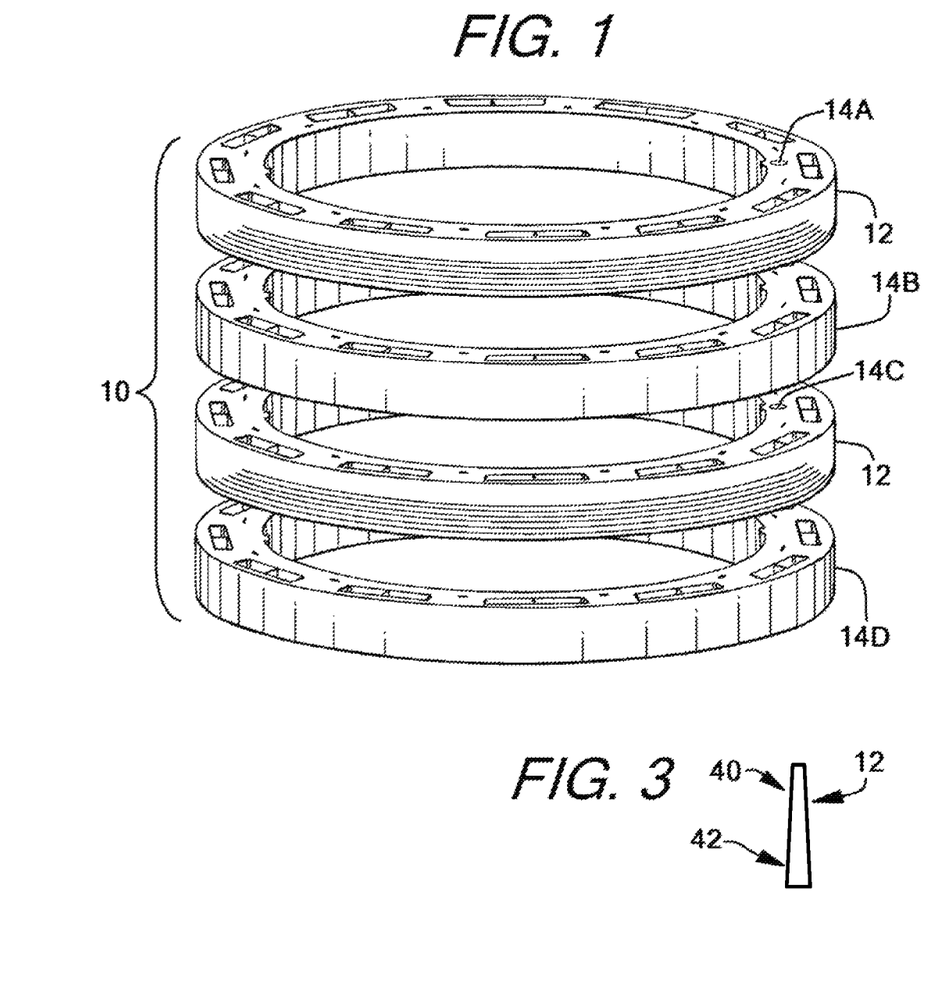
FIG. 1 shows an assembly drawing in perspective of a plurality of rotor lamination sub-stacks used to form a rotor core of a desired height.
FIG. 3 shows a cross-sectional view of a steel sheet material having a variation in thickness from a thin/light end to a thick/heavy end.

As shown in FIG. 1, it is common to address weight imbalances due to material thickness variations by first punching and stacking several laminations into sub-packets without rotating the individual laminations. Rotation is achieved by varying the key rotational angles compared to the magnetic slots as shown in FIGS. 4A-D. This spreads the weight imbalances equally about the circumference to achieve rotational weight balance. Additionally, it helps reduce cogging torque in the finished motor.

Figure 5:
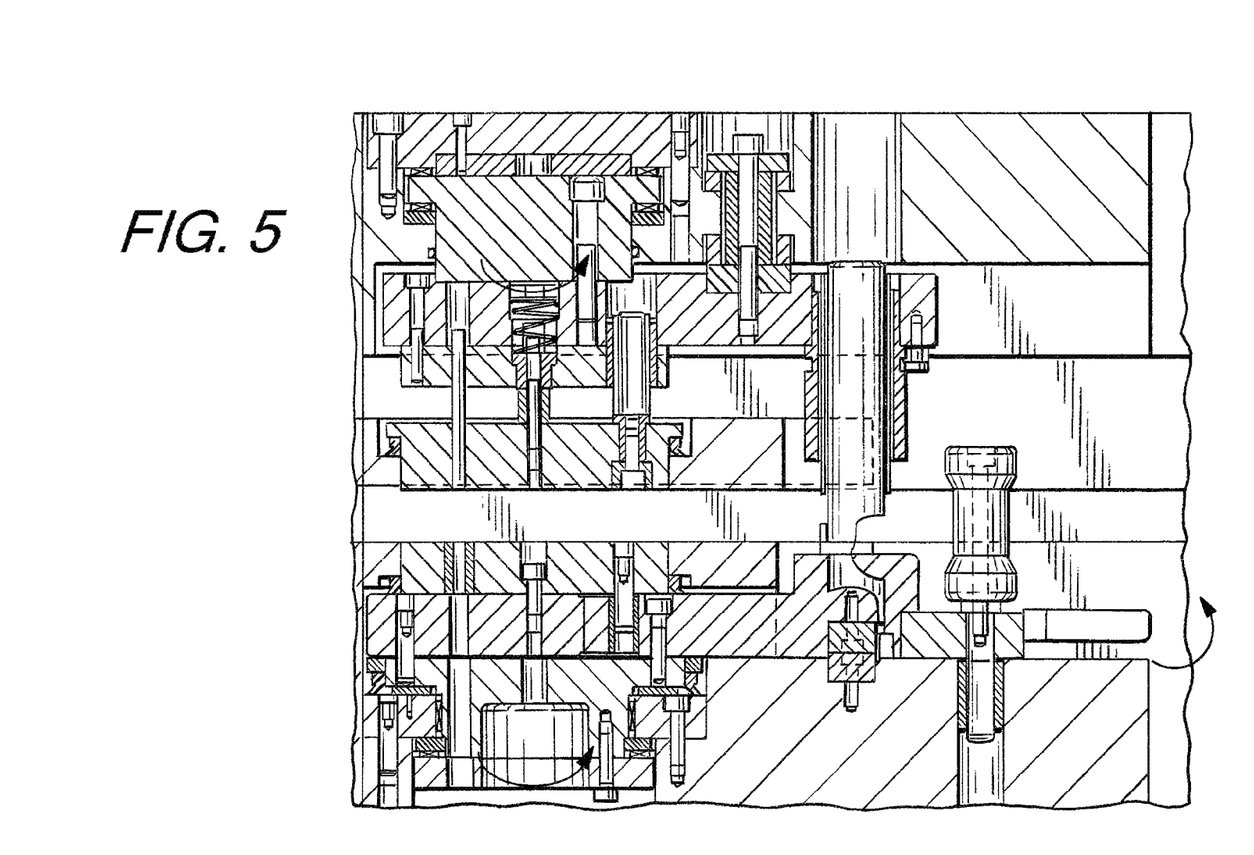
FIG. 5 a side elevation view in partial cross-section of a prior art series of progressive dies to produce the rotated key feature of FIG. 1 with either a manually rotated inner diameter (ID) with integral key stations or one rotated with a servo motor.

Progressive dies to produce the rotated key feature are currently designed with either a manually rotated inner diameter (ID) with integral key stations or one rotated with a servo motor (FIG. 5). These designs require that die, punch, and stripper all be mounted to a sub-die set within the main die set and rotated as a unit. Rotating the sub-die set manually requires stopping the press, reducing manufacturing efficiency. Rotating with a servo motor can be less accurate and increase the potential for producing out of tolerance parts. Both options can add considerable cost to tooling and have a maximum rotational capability of 10-15°.

Figure 6:
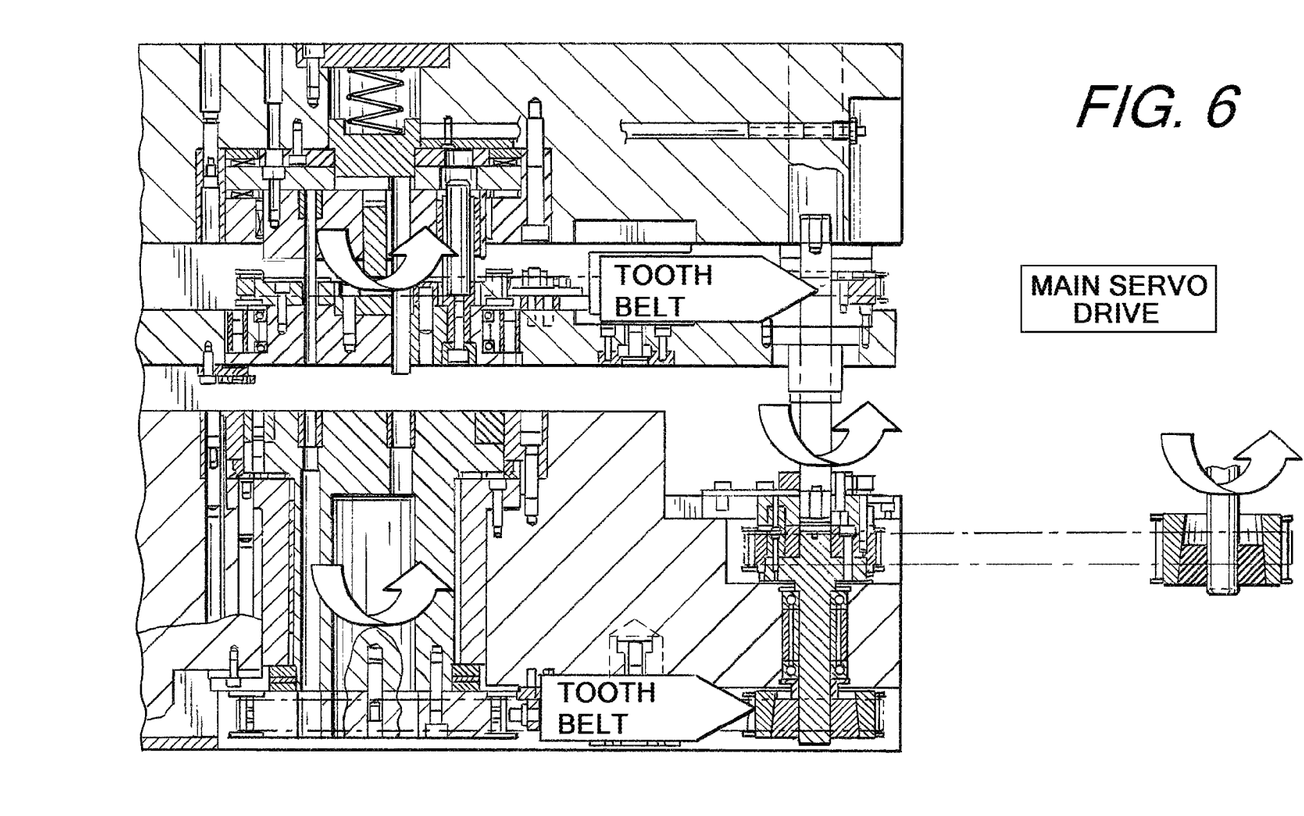
FIG. 6 is a side elevation view of a die, stripper, and punch components not installed in a sub-die set.

Dies can also be produced that rotate separate die, stripper, and punch components not installed in a sub-die set (FIG. 6). This option is more complex and has a higher potential for breakdown.

Thus, there is a need for an increased efficiency system, machine, and method for forming rotor cores for IPM motors.

SUMMARY OF THE INVENTION

Disclosed herein is a method for forming a rotor or stator core. The method includes the steps of: (1) providing a sheet of electrical steel having opposed edges with a first edge being a light-weight portion and a second edge being a heavy-weight portion and an orientation line extending between the first edge and the second edge; (2) providing a plurality of key punches disposed about an inner diameter area of the sheet of electrical steel and circumferentially spaced from one another; (3) providing an inner diameter punch for removing the inner diameter area from the sheet of electrical steel, the inner diameter punch having a first relief area; (4) activating a first key punch of the plurality of key punches to cut the electrical steel sheet to remove a portion to form a first key disposed at a first key rotational angle from the line of orientation from a plurality of key rotational angles; (5) positioning the first relief area over the first key and punching the electrical steel sheet with the inner diameter punch to remove the inner diameter area from the electrical steel sheet material to form a first lamination with the first key; (6) repeating the key punching step and the inner diameter punching step to form a first plurality of the first laminations; (7) stacking the first plurality of the first laminations into a first stack of laminations; (8) activating a second key punch of the plurality of key punches to cut the electrical steel sheet to form a second key disposed at a second key rotational angle from the plurality of key rotational angles different from the first key rotational angle; (9) positioning the first relief area over the second key and punching the electrical steel sheet with the inner diameter punch to remove the inner diameter area from the electrical steel sheet material to form a second lamination with the second key; (10) repeating the key punching step and the inner diameter punching step to form a second plurality of the second laminations; (11) stacking the second plurality of the second laminations to form a second stack of laminations; (12) providing a shaft having a generally cylindrical wall having an axis of rotation, an outer surface, and a length dimension, a first keyway is provided in the outer surface and extends axially along a portion of the length dimension; (13) mounting the first stack of laminations on the shaft with the first key inside the first keyway; and, (14) mounting the second stack on the shaft with the second key inside the first keyway.

BRIEF DESCRIPTION OF THE DRAWINGS

To understand the present invention, it will now be described by way of example, with reference to the accompanying drawings and attachments in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
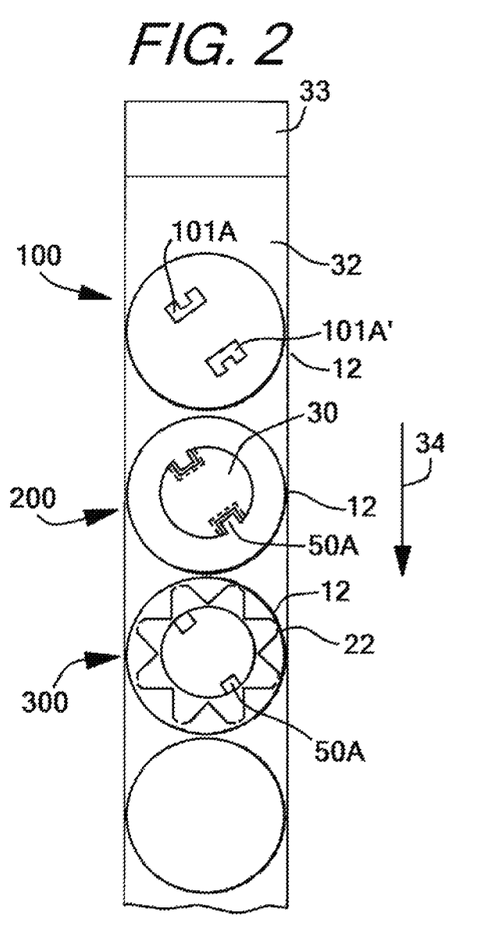
FIG. 2 shows a plan view of a series of lamination punching stations.
Figure 4A:
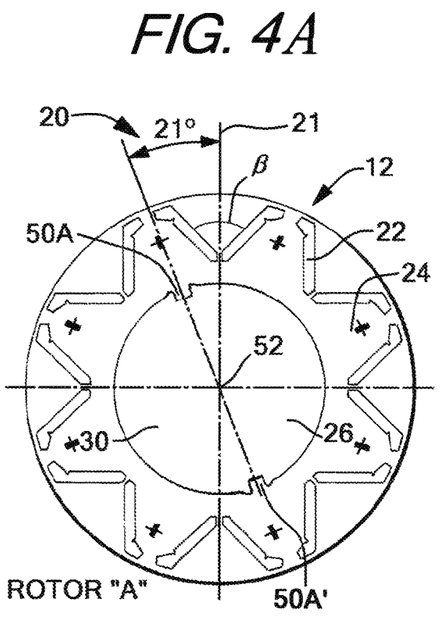
FIGS. 4A-D are plan views showing a prior art lamination with four (A-D) different key rotational angles compared to the magnetic slots in a lamination and an inner die punch superposed over the lamination.
Figure 4B:
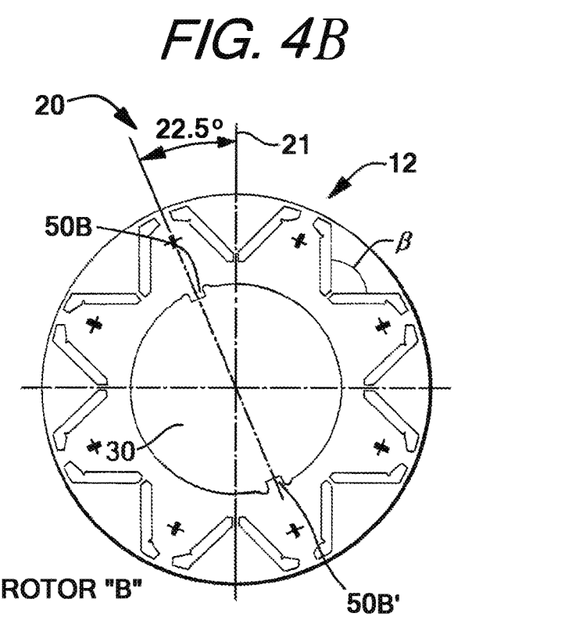
Figure 4C:
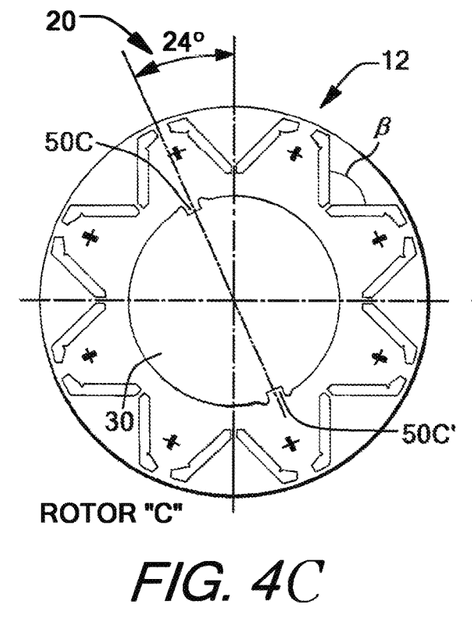
Figure 4D:
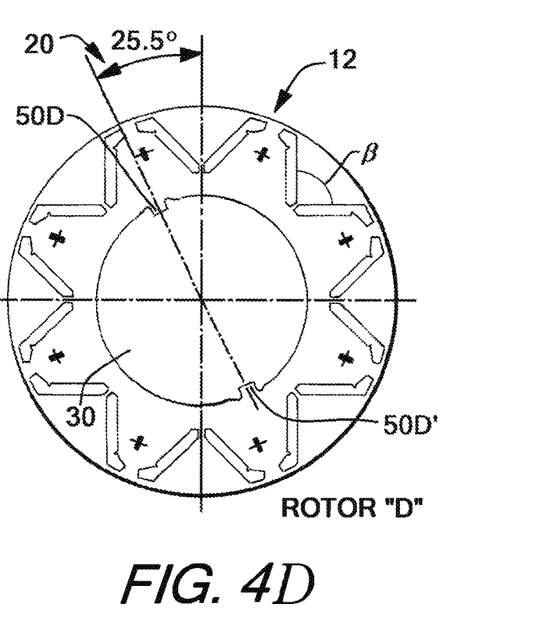

Rotating electric machines such as motors, generators, and alternators, generally speaking, have a rotor mounted for rotational movement with respect to a stator or the stator is rotated with respect to the rotor. Rotors and stators are manufactured by cutting laminations from a strip of electrical steel and stacking the laminations to form a rotor/stator core of a desired height. It is important for a rotor/stator to be balanced for rotational motion to reduce vibration and noise created when a rotor/stator is out of balance. A major part of the initial imbalance of the rotor is accounted for by the imbalance due to accumulated deviation in thickness of the laminated steel plates in the rotor core. Electrical steel sheets are roll formed, and tiny deviations occur in widthwise thickness of the steel plate material while it is rolled (FIGS. 2 and 3). Current manufacturing techniques aimed at addressing this issue have failed to completely eliminate such deviations. These tiny deviations in thickness accumulate in the rotor/stator core and result in a significant amount of deviation in thickness in the rotor/stator core. Accordingly, a significant initial imbalance occurs at a rotor/stator in which the laminated body is assembled into a stack of laminations referred to as a rotor/stator core.

Interior permanent magnet (IPM) machines, motors and generators, for example, can benefit from the manufacturing techniques and methods described herein. IPM electric machines have permanent magnets built into the rotor core. Typically, slots are formed in each lamination and these slots, when accumulated by stacking into a rotor core, align to form channels for receiving magnetic material. The rotor is mounted for rotational movement within a stator. A rotating magnetic field at a frequency is created in the stator using 3-phase alternating current, as is well known in the art, and the rotor rotates at the same frequency as the magnetic field. Such motors are useful for applications where a low torque ripple is desired, for example.

As is shown in FIG. 1, it is common in the prior art to address weight imbalances in IPM rotor cores 10 by punching laminations from an electrical steel material and stacking several laminations 12 into sub-packets 14—without rotating the individual laminations 12. Several of such sub-packets 14 are stacked or otherwise connected to form a rotor core 16 of a desired height.

FIG. 2 shows diagrammatically the progression of laminations 12 through a key stamping station 100, an inner diameter punch station 200, and an outer diameter punch station 300 of a rotor stack forming machine or die. Each lamination 12 is punched from a strip of magnetic steel sheet material 32 typically stored in a coiled roll 33. A series of rollers or other means of conveyance are used to move the electric steel strip in a rolling direction 34 indicated by the arrow. The magnetic steel sheet 32 is manufactured by rolling and has a deviation in lamination thickness as shown in FIG. 3 at a right angle to the rolling direction 34 of the steel sheet. Consequently, each lamination 12 is thinner and lighter on one side 40 than an opposed thicker and heavier side 42. It is these size and weight deviations that are addressed through varying the key rotation angles of the sub-packets 14, as will be discussed.

FIGS. 4A-D show the rotor lamination 12 having an outer diameter area 24 and an inner diameter area 26. The inner diameter area 26 is shown with an inner diameter punch 30 superposed over the lamination 12. The inner diameter area 26 has a pair of opposed keys 50A,A', for example, spaced 180° apart. The keys 50 are positioned at an angle 20 to the magnetic slots. The angle 20 is between an orientation line 21 and a key line 23. The orientation line 21 is drawn from a center point 52 of the lamination 12 radially outward through a center of the magnetic slot 22. The key line 23 is drawn radially outward from the center point 52 of the lamination to a center portion of the key 50. This angle 20 shall sometimes be referred to as the key rotational angle 20.

FIGS. 4A-D differ by their key rotational angle 20 which respectively are 21°, 22.5°, 24°, and 25.5°. The key rotational angles can differ from this embodiment and can range from 5 degrees to 45 degrees, more preferably 10 degrees to 40 degrees, and even more preferably 15 degrees to 35 degrees.

In this embodiment, the difference between each consecutive orientation angle in FIGS. 4A-D is 1.5° which shall be referred to as the index number or index angle, expressed in degrees. Suitable index numbers can vary based on the diameter of the lamination, the number of magnetic slots, the number of keys, and other parameters known to those of ordinary skill in the art. Preferably the index number is in the range of 0.5 degrees to 20 degrees, more preferably from 1 degree to 10 degrees, and even more preferably 1 degree to 5 degrees, and most preferably from 1.5 degrees to 3 degrees.

Additionally, 4 different key rotational angles are shown, but a different number of key rotational angles could be used. For example, it is contemplated using from 2 to 12 different orientation angles in the single rotor stack 10 of a desired height.

Figure 8:
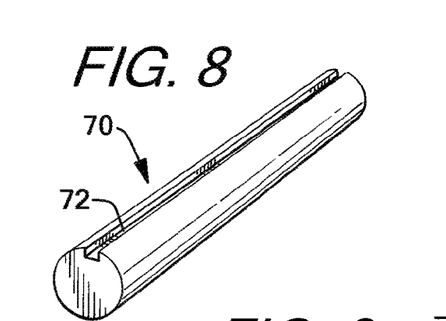
FIG. 8 is a perspective view of a keyed shaft having a single keyway.
Figure 9:
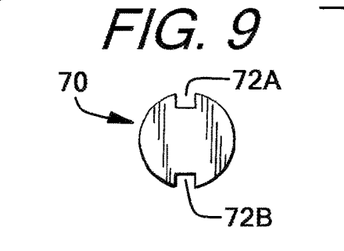
FIG. 9 is an end view of a keyed shaft having two keyways.

In this embodiment, four sub-packets 14 (FIG. 1) will be fabricated, with the key rotational angles shown, and when the four sub-packets 14A-D are slid on to the single or dual keyed shaft 70 (FIGS. 8 and 9) of a motor, each adjacent sub-packet will have a 1.5° difference in orientation. FIG. 8 shows a keyed shaft 70 with a single key 72 and FIG. 9 shows a dual keyed shaft 70 having two keys 72A,B opposed to one another 180° apart. If N number of sub-packets 14 are in the rotor core 10 of a desired height, then the first sub-packet and the Nth subpacket will have a difference in orientation of N×Index angle. In this embodiment N=4 sub-packets per rotor core and the index angle is 1.5° so the difference in orientation of the rotor core 10 is 1.5°×4=6°.

Figure 7:
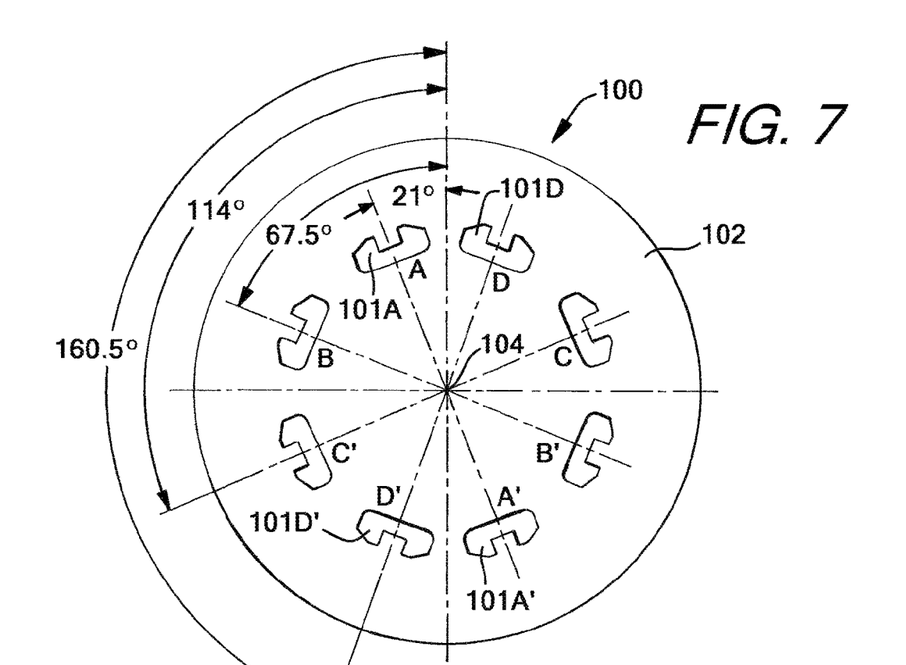
FIG. 7 is a plan view of multiple sets of key punches.

FIG. 7 shows a key punch station 100 having a generally circular plate 102 having a center point 104. Four sets of pairs of key punches 101 A-D are mounted for rotation together about an axis through the center point 104. The key punches are shown in pairs, for example 101A and A', and are for forming the pairs of keys 50A-D. Key punches 101 are shown in pairs disposed 180° apart to create opposed key pairs, 50A,A' of FIG. 4, which in turn are dimensioned to engage slots 72A,B of the dual keyed shaft 70 of FIG. 9. It is contemplated that the pair of key punches could be replaced with a single key punch to produce a single key to engage a single slot 72 on a single keyed shaft 70 of FIG. 8.

In the key punching station 100 (FIGS. 2 and 7) one pair of the key punches 101 say 101A,A', is moved into a desired position over the electric steel strip 32 and activated to punch out holes through the lamination creating the pair of keys 50 14A. A desired number of key punch cycles are carried out using the key punch pair 101A,A' to reach the desired number of laminates in a sub-packet 14A. Then the other key punches 101B,B; 101C,C; and 101D,D' are used to punch out laminations from the electric steel strip to create sub-packets 14B-D. In one embodiment, the key punches 101A-D are cam activated to move the punch away from the plate and to cut a complementary shaped piece from the electrical steel strip to form a key 50.

Figure 10:
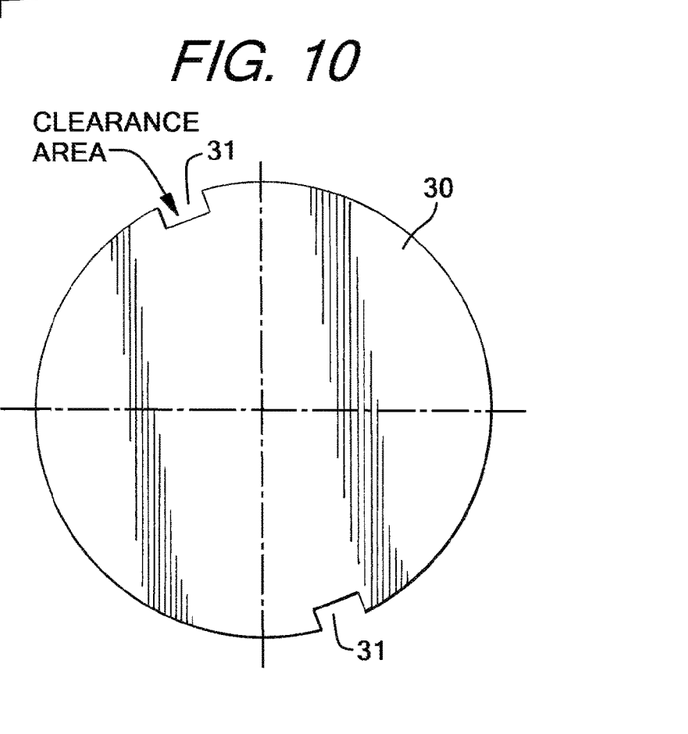
FIG. 10 is a plan view of an inner diameter (ID) punch with relief areas.
Figure 11:
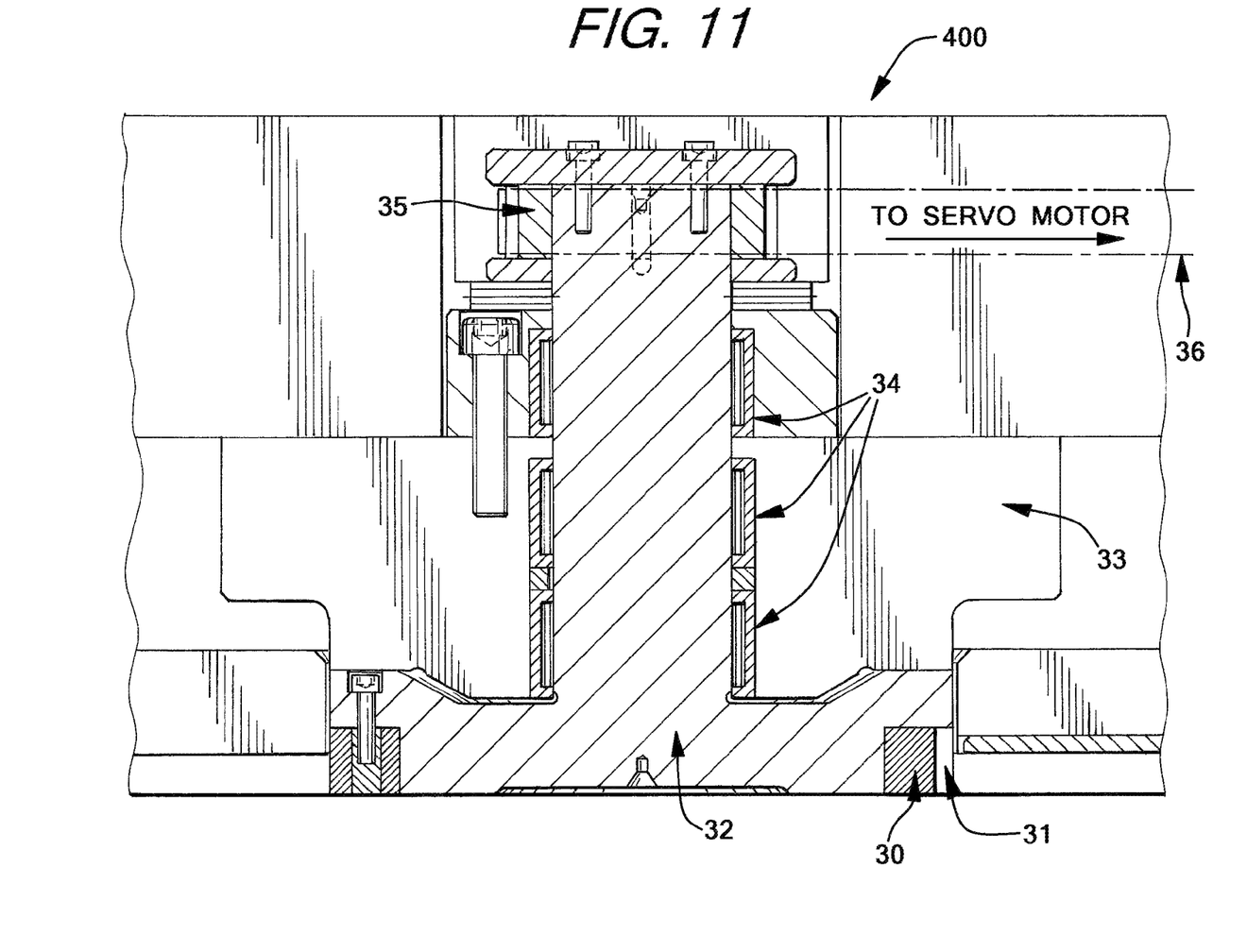
FIG. 11 is a side elevation view of a servo motor for aligning the relief area of the ID punch with the key location during ID punching.

FIG. 10 shows the inner diameter (ID) punch 30, used in the ID punch station 200, has two relief areas 31 disposed 180° apart that are positioned over the pair of keys 50 so that the inner diameter punch does not remove the keys formed in the key punch station 100. FIG. 11 shows the ID punch 30 is rotated via a servo motor 400. ID punch 30 with keyway relief areas 31 is attached to pedestal base 32 which is located in a stationary punch base 33 via roller bearings 34. Servo motor 400 drives timing belt 36 to drive timing pulley 35 which is fixed to pedestal base 32. This causes ID punch 30 with relief areas 31 to rotate.

The outer diameter area 26 of the laminations 12 has eight V-shaped magnetic slots 22 disposed about a circumference of the lamination 12 and are equally spaced from one another. (FIGS. 4A-D) The magnetic slots 22 are formed in an outer diameter punching (OD) station 300 of FIG. 2. The magnetic slots can be cut one at a time or multiple slots at a time in the OD as is well known in the art. The magnetic slots 22 could be of different shape from that shown such as polygonal, circular, and oval for example. Suitable polygons include those having from 3 sides to 8 sides and include triangles, rectangles, squares, pentagons, heptagons, and octagons. The V-shaped slots 22 have a first leg 22A and a second leg 22B disposed at an angle θ to the first leg 22A. Each leg 22A,B has a generally rectangular cross-sectional shape and terminate at a radial outward end in an enlarged portion 60 which sometimes may be referred to as a foot 60. The foot 60 has an outer edge that extends along a peripheral edge 62 of the laminate 12. The radial inward ends 64 of the legs 22A,B are in close proximity to one another but do not touch. Each leg 22A,B of the magnetic slots 22 are dimensioned to receive a permanent magnet and to retain the magnet. An adhesive may be used to secure the permanent magnet in place.

As is well known in the prior art, once each sub-packet 14 is formed, permanent magnets are inserted into each magnetic slot 22 and secured in place by an adhesive or an interference fit or both. The magnets can be inserted into the slots 22 and then the sub-packet mounted on the keyed shaft, or the sub-packet can be mounted on the keyed shaft and then the magnets can be inserted into the slots 22 and secured in place as described. A permanent magnet is one that retains its magnetic properties after the magnetizing force is removed. Ferromagnetic materials are used to create permanent magnets and include iron, cobalt, and some alloys of rare earth metals. One such rare earth alloy contains neodymium, iron and boron and is known as a neodymium magnet.

Suitable adhesives for attaching the magnet into the slot includes cyanoacrylate-type adhesives, anaerobic adhesives, acrylates, methacrylates, ethacrylates, and/or isobornyl methacrylates, polyurethanes, epoxy/polyurethane hybrids, epoxies, heat-curable adhesives, hot-melt adhesives, enamels, lacquers, UV curable adhesives, and others well known to those of ordinary skill in the art.

The electrical steel sheet material is preferably a material which has soft magnetic properties and is suitable, for example, as a material for magnetic cores. Preferably, the electrical steel sheet is cold-rolled material of an iron-silicon alloy. Lamellae produced therefrom are suitable for the production of magnetic circuits for electrical machines, in particular iron cores of dynamos, generators, electric motors, transformers, relays, contactors, choke coils, ignition coils, electricity meters, and controllable deflection magnets. An electric sheet strip here is a windable material made of electrical steel, which has a small width in relation to its length, and can be stored in a spool 33 such as is shown in FIG. 2. For the purposes of the present invention, an electrical sheet is particularly cold-rolled, non-oriented electrical steel according to ASTM A677.

Figure 12:
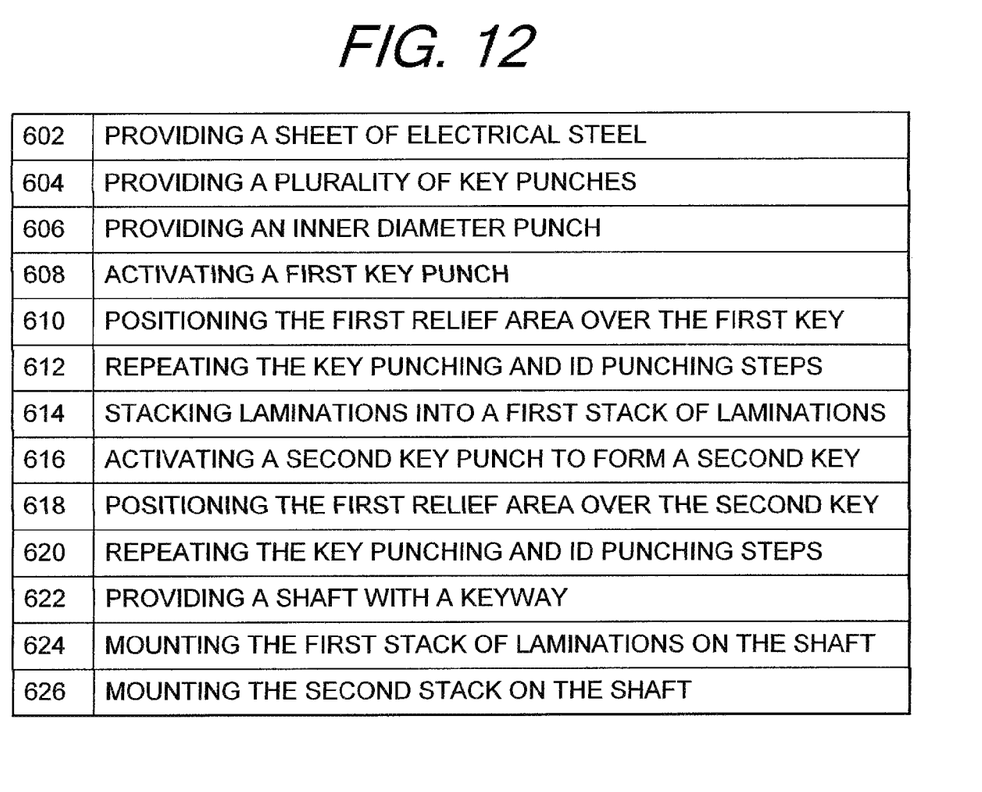
FIG. 12 is a flowchart of a method for forming a rotor core for an IPM motor.

FIG. 12 shows a method 600 for forming a rotor or stator core. The steps include: (1) providing a sheet of electrical steel having opposed edges with a first edge being a light-weight portion and a second edge being a heavy-weight portion and an orientation line extending between the first edge and the second edge (602); (2) providing a plurality of key punches disposed about an inner diameter area of the sheet of electrical steel and circumferentially spaced from one another (604); (3) providing an inner diameter punch for removing the inner diameter area from the sheet of electrical steel, the inner diameter punch having a first relief area (606); activating a first key punch of the plurality of key punches to cut the electrical steel sheet to remove a portion to form a first key disposed at a first key rotational angle from the line of orientation from a plurality of key rotational angles (608); positioning the first relief area over the first key and punching the electrical steel sheet with the inner diameter punch to remove the inner diameter area from the electrical steel sheet material to form a first lamination with the first key (610); repeating the key punching step and the inner diameter punching step to form a first plurality of the first laminations (612); stacking the first plurality of the first laminations into a first stack of laminations (614); activating a second key punch of the plurality of key punches to cut the electrical steel sheet to form a second key disposed at a second key rotational angle from the plurality of key rotational angles different from the first key rotational angle (616); positioning the first relief area over the second key and punching the electrical steel sheet with the inner diameter punch to remove the inner diameter area from the electrical steel sheet material to form a second lamination with the second key (618); repeating the key punching step and the inner diameter punching step to form a second plurality of the second laminations (620); stacking the second plurality of the second laminations to form a second stack of laminations (622); providing a shaft having a generally cylindrical wall having an axis of rotation, an outer surface, and a length dimension, a first keyway is provided in the outer surface and extends axially along a portion of the length dimension (624); mounting the first stack of laminations on the shaft with the first key inside the first keyway (626); and mounting the second stack on the shaft with the second key inside the first keyway (628).

The step of positioning the first relief area over the first key 610 comprises the step of rotating the inner diameter punch over the steel strip while a die and stripper on an opposite side of the steel strip remain stationary.

Many modifications and variations of the present invention are possible in light of the above teachings. It is, therefore, to be understood within the scope of the appended claims the invention may be protected otherwise than as specifically described.

I claim:

1. A method for forming a rotor or stator core comprising:
providing a sheet of electrical steel having opposed edges with a first edge being a light-weight portion and a second edge being a heavy-weight portion and an orientation line extending between the first edge and the second edge;
providing a plurality of key punches disposed about an inner diameter area of the sheet of electrical steel and circumferentially spaced from one another;
providing an inner diameter punch for removing the inner diameter area from the sheet of electrical steel, the inner diameter punch having a first relief area;
activating a first key punch of the plurality of key punches to cut the electrical steel sheet to remove a portion to form a first key disposed at a first key rotational angle from the line of orientation from a plurality of key rotational angles;
positioning the first relief area over the first key and punching the electrical steel sheet with the inner diameter punch to remove the inner diameter area from the electrical steel sheet material to form a first lamination with the first key;
repeating the key punching step and the inner diameter punching step to form a first plurality of the first laminations;
stacking the first plurality of the first laminations into a first stack of laminations;
activating a second key punch of the plurality of key punches to cut the electrical steel sheet to form a second key disposed at a second key rotational angle from the plurality of key rotational angles different from the first key rotational angle;
positioning the first relief area over the second key and punching the electrical steel sheet with the inner diameter punch to remove the inner diameter area from the electrical steel sheet material to form a second lamination with the second key;
repeating the key punching step and the inner diameter punching step to form a second plurality of the second laminations;
stacking the second plurality of the second laminations to form a second stack of laminations;
providing a shaft having a generally cylindrical wall having an axis of rotation, an outer surface, and a length dimension, a first keyway is provided in the outer surface and extends axially along a portion of the length dimension;
mounting the first stack of laminations on the shaft with the first key inside the first keyway; and
mounting the second stack on the shaft with the second key inside the first keyway.

2. The method of claim 1 further comprising a motor connected to the inner diameter punch for rotating the relief area into alignment with the first key.

3. The method of claim 1 wherein each key punch of the plurality of key punches has two punches spaced 180° apart for forming two keys.

4. The method of claim 3 further comprising a second keyway on the shaft spaced 180° from the first keyway.

5. The method of claim 4 further comprising a second relief area spaced 180° from the first relief area.

6. The method of claim 1 further comprising the step of providing an outer diameter punch for forming a plurality of magnet slots spaced about a circumference of an outer diameter area of the sheet of electrical steel.

7. The method of claim 6 further comprising the step of inserting a permanent magnet into each of the plurality of slots.

8. The method of claim 6 wherein the plurality of magnet slots comprises a plurality of pairs of adjacent magnet slots wherein each key of the plurality of keys is positioned between each pair of magnet slots.

9. The method of claim 6 wherein the magnet slots are generally V-shaped.

10. The method of claim 6 wherein the magnet slots are generally rectangular.

11. The method of claim 1 wherein the step of positioning the first relief area over the first key is done with a servo motor.

12. The method of claim 1 wherein the first key rotational angle and the second key rotational angle differ by a separation angle from 0.5 degrees to 3 degrees.

13. The method of claim 1 wherein each of the plurality of key rotational angles is within a range of 5 degrees to 45 degrees.

14. The method of claim 1 wherein the unique key rotational angle is within the range of 20 degrees to 30 degrees.

15. The method of claim 1 wherein the step of activating a first key punch of the plurality of key punches to cut the electrical steel sheet is cam activated.

16. The method of claim 1 wherein the step of positioning the first relief area over the first key comprises the step of rotating the inner diameter punch.

17. The method of claim 16 wherein the step of rotating the inner diameter punch comprises a motor.

18. The method of claim 17 wherein the motor is a servo motor.

19. The method of claim 17 further comprising a die and a stripper, the die being positioned under the inner diameter punch on an opposite side of the electrical steel sheet.

20. The method of claim 19 wherein the step of positioning the first relief area over the first key comprises rotating the inner diameter punch while the die and the stripper remain stationary.

* * * * *